July 24, 1934.  B. J. SANFORD  1,967,432
VEHICLE
Filed Sept. 12, 1932   3 Sheets-Sheet 1

INVENTOR.
BERT J. SANFORD
BY A. R. McGrady
ATTORNEY.

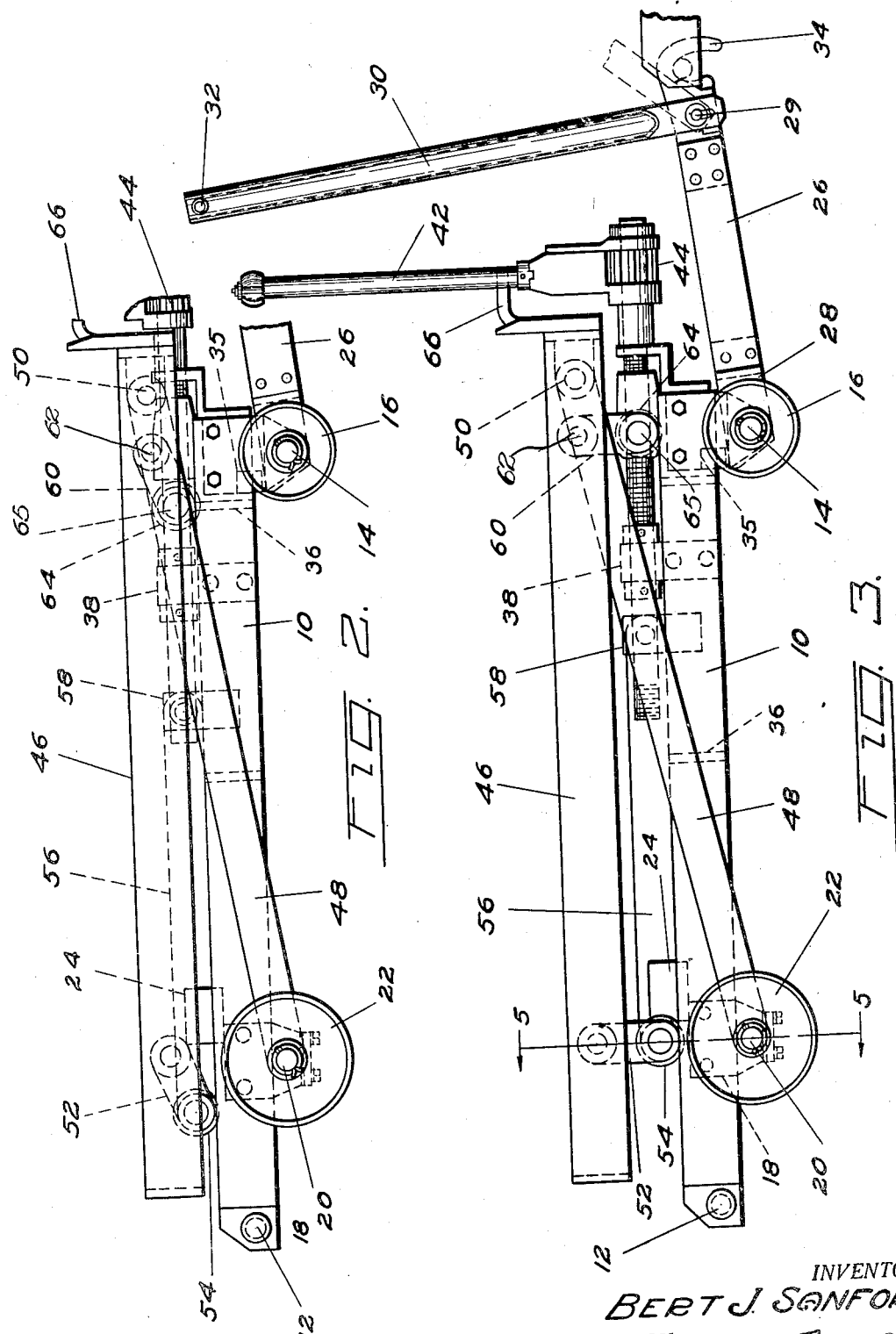

July 24, 1934.       B. J. SANFORD       1,967,432
VEHICLE
Filed Sept. 12, 1932       3 Sheets-Sheet 3

INVENTOR.
BERT J. SANFORD
BY Q. Q. McCrady
ATTORNEY.

Patented July 24, 1934

1,967,432

UNITED STATES PATENT OFFICE 1,967,432

VEHICLE

Bert J. Sanford, South Bend, Ind., assignor to Bendix Aviation Corporation, South Bend, Ind., a corporation of Delaware Application September 12, 1932, Serial No. 632,817

2 Claims. (Cl. 254—7)

This invention relates to trucks, and more particularly to industrial trucks designed to elevate as well as carry a load.

An object of the invention is to provide an improved truck of the type having a vertically movable platform adapted to be positioned under the load and raised manually to cause the platform to assume the weight of the load.

A further object is to provide a truck of rugged construction, capable of carrying very heavy loads, and which is simple and inexpensive to manufacture.

A further object is to provide a lift truck capable of being connected in a train or series of similar trucks.

Further objects and advantages of the invention will be apparent from the following description, taken in connection with the appended drawings, in which:

Figure 2 is a side elevation of the same, showing the platform in lowered position;

Figure 3 is a view similar to Figure 2, but showing the platform in raised position;

Figure 1:
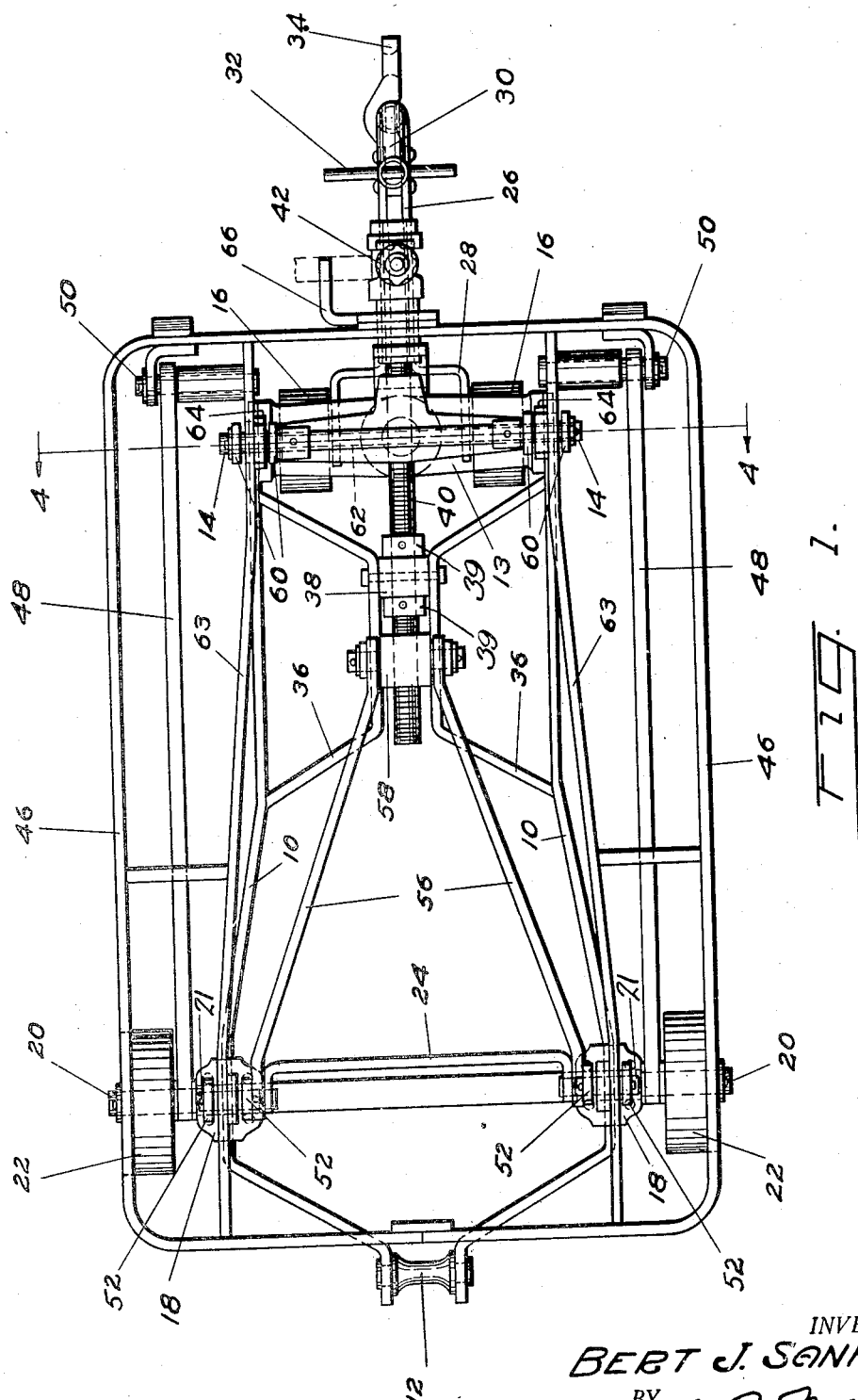
Figure 1 is a plan view of a truck embodying the invention.

The truck illustrated in the drawings comprises a frame made up of longitudinal members 10 secured together at their rear ends by a rotatable coupling roller 12 and joined at their forward ends by a bolster 13 supported by an axle shaft 14 having mounted thereon wheels 16. Toward the rear of the truck the members 10 are provided with brackets 18 in which are journalled two short axle shafts 20 upon which are mounted the rear wheels 22. Shafts 20 are connected together by a brace 24 which is welded to the shafts to give rigidity to the truck frame.

A tongue 26 is connected to the forward axle 14 by means of a bifurcated member 28 and has pivoted thereto by a pin and slot connection 29 a handle 30 having a cross piece 32 whereby the truck may be drawn manually in the usual manner. The pin and slot connection is designed to maintain the handle in the vertical position indicated in full lines in Figure 3, or to permit it to assume the inclined position indicated in dotted lines in the same figure. The forward end of the tongue is provided with a downwardly extending hook 34 adapted to receive the coupling roller 12 at the rear end of a similar truck as indicated in Figure 3, whereby a plurality of trucks may be coupled together in a train. Arcuate stops 35 are secured to the bolster 13, as by welding, and designed to contact with the rear end of the member 28 to prevent the tongue 26 from dropping below a substantially horizontal position.

A pair of brackets 36 extend inwardly from members 10 and support a bearing 38 which is journalled to receive a screw 40 which is prevented from moving in bearing 38 by a plurality of stops 39 fixed to screw 40 on either side of bearing 38. Screw 40 has pivoted at its forward end a lever 42 connected to the screw by a pawl and ratchet mechanism 44.

Figure 4:
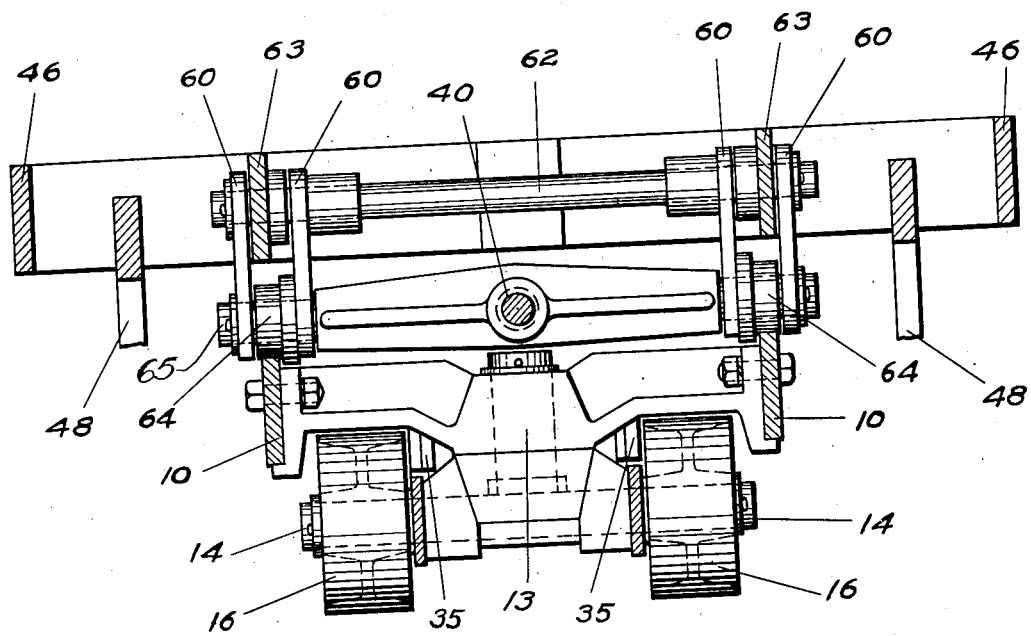
Figure 4 is a sectional view taken on the line 4—4 of Figure 1.
Figure 5:
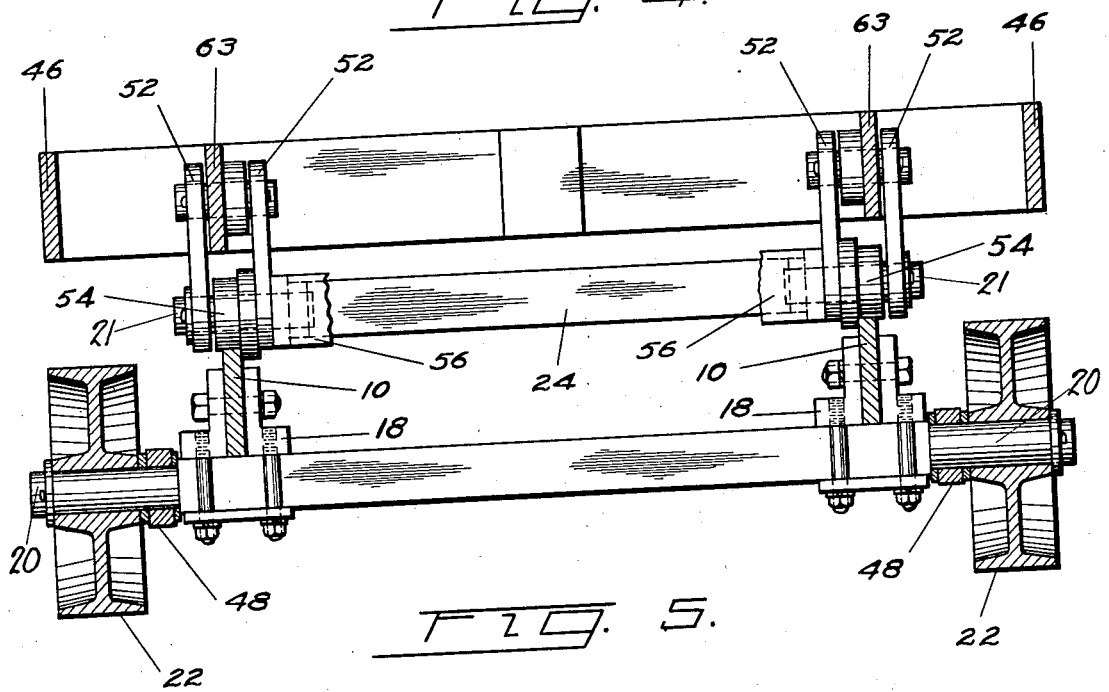
Figure 5 is a sectional view taken on the line 5—5 of Figure 3.

A skeleton platform 46 is positioned above the frame members 10 and is of generally rectangular shape and adapted to support the material to be transported by the truck. A pair of links 48 extend from the rear axle shafts 20 to pins 50 mounted at the forward end of the platform 46, thus connecting the frame and platform together and substantially preventing longitudinal movement therebetween. The platform is supported by two links 52 pivotally connected to the platform and having at their lower ends rollers 54 adapted to ride on the upper edges of members 10. Connecting members 56 connect the lower ends of links 52 to a nut 58 which engages the screw of 40 in threaded relation, so that upon rotation of the screw in the clockwise direction as viewed in Figure 4, the links will be brought from the inclined position shown in Figure 2 to the vertical position shown in Figure 3. Similar links 60 are provided at the forward end of the platform, and are pivotally connected to a cross shaft 62 which extends between longitudinal members 63 of the platform 46, and their lower ends are provided with rollers 64 mounted upon an axle 65 and adapted to ride on the upper edges of members 10. Axle 65 is fixed at its center to a travelling nut, (similar to nut 58) which is mounted upon the forward end of screw 40.

The forward end of platform 46 is provided with a stop 66 against which the lever 42 may rest.

In operation, the material to be transported is supported, by skids or otherwise, at a sufficient distance above the floor to permit the truck with the platform lowered to be positioned beneath it. The truck is brought into position beneath the load by means of handle 30, and the platform is then raised by oscillating lever 42, causing the platform to assume the weight of the load. The truck is then coupled to a power truck, either directly or through the medium of other similar lift trucks, and is moved to its destination, whereupon the platform is lowered to seat the load upon the floor and release the truck for further operations.

Although the invention has been described with reference to a particular embodiment thereof, it may be embodied in other forms and is not limited, except by the terms of the following claims.

I claim:

1. A truck comprising a wheeled frame, a platform movable relative to the frame, a link pivotally connecting the frame and platform to limit horizontal movement therebetween, a bearing member fixed to the frame, and a screw journalled in said bearing member, a manually actuated oscillating member for actuating said screw, compression members adapted to support the platform above the frame, and connecting means between said screw and the compression members for moving the compression members from an inclined to a vertical position.

2. A truck as defined in claim 1, wherein the compression members comprise four links pivoted to the platform and having rollers engaging the frame in rolling relation.

BERT J. SANFORD.